Figure 1:
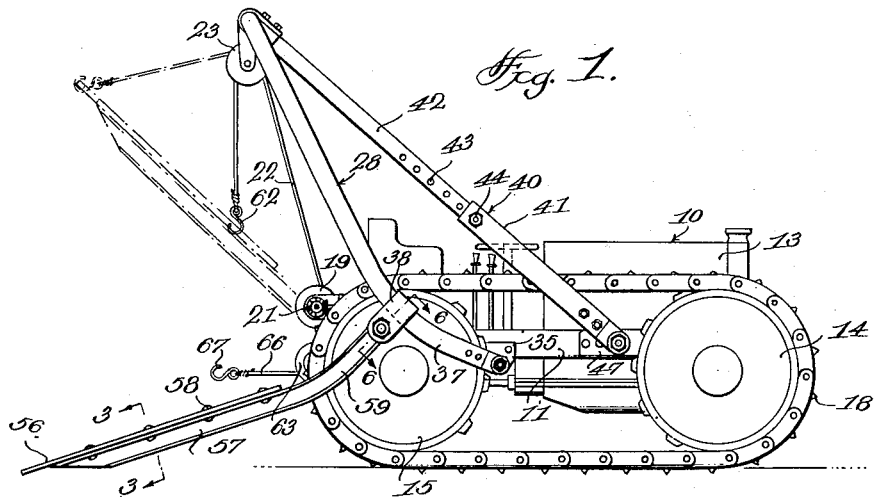

April 25, 1939.  E. H. KING  2,156,183
LOGGING APPARATUS
Filed May 9, 1938  2 Sheets-Sheet 1

Inventor
Elsie H. King
By Kimmel & Crowell
Attorneys.

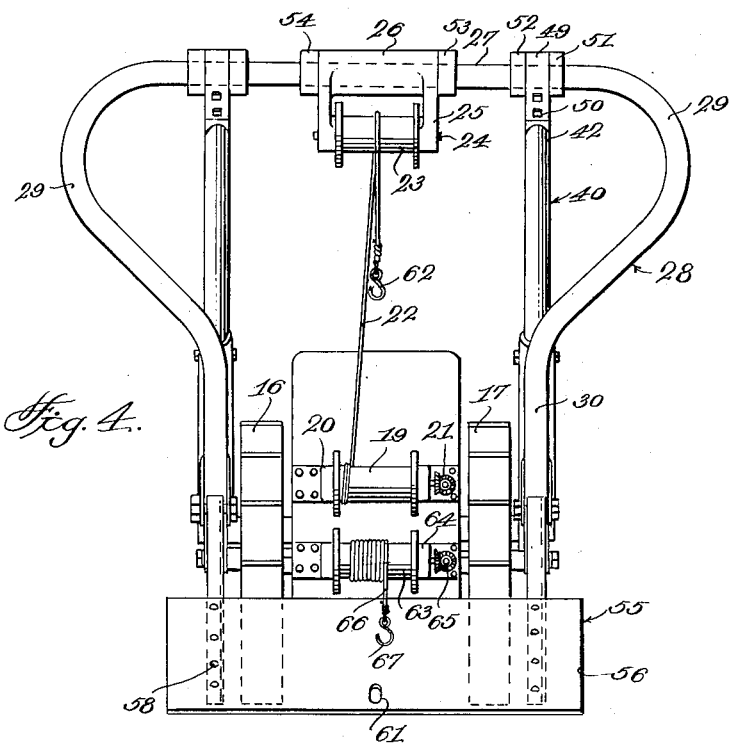
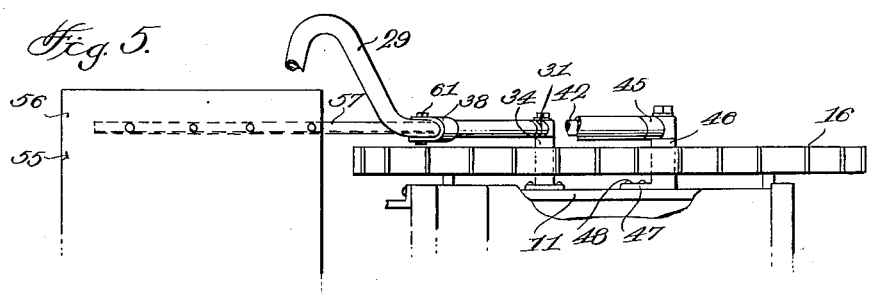
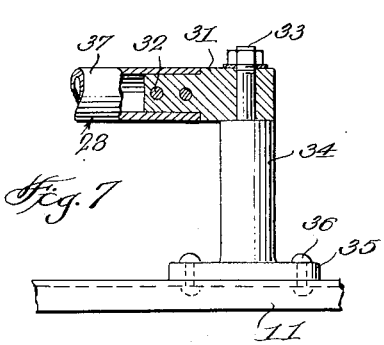

Patented Apr. 25, 1939

2,156,183

UNITED STATES PATENT OFFICE 2,156,183

LOGGING APPARATUS

Elsie H. King, South Bend, Wash.

Application May 9, 1938, Serial No. 206,860

5 Claims. (Cl. 214—65.3)

This invention relates to logging devices and more particularly to an attachment to be placed on a tractor for towing, pulling, raising or dragging logs.

An object of this invention is to provide in combination with a tractor having an endless tread or traction an attachment in the form of a rig or elevating means which may be readily secured to the frame or body of the tractor so as to permit the use of the tractor in the handling of logs.

This invention is an improvement over the structure disclosed in my co-pending application Serial Number 173,023 which was filed November 5, 1937, now Patent No. 2,131,402, granted September 27, 1938.

Another object of this invention is to provide an improved rig for attachment to the frame of the tractor so that the device may be readily removed from the tractor when desired and will not interfere with the operation of the tractor when the rig or elevating structure is removed.

A further object of this invention is to provide an attachment of this kind which is simple in construction and which may be readily mounted on the tractor frame without disturbing the present parts of the tractor.

To the above objects and to others which may hereinafter appear, the invention consists of the novel construction, combination and arrangement of parts as will be more specifically described and illustrated in the accompanying drawings, but it is to be understood that changes, variations and modifications may be resorted to which fall within the scope of the invention as claimed.

Figure 2:
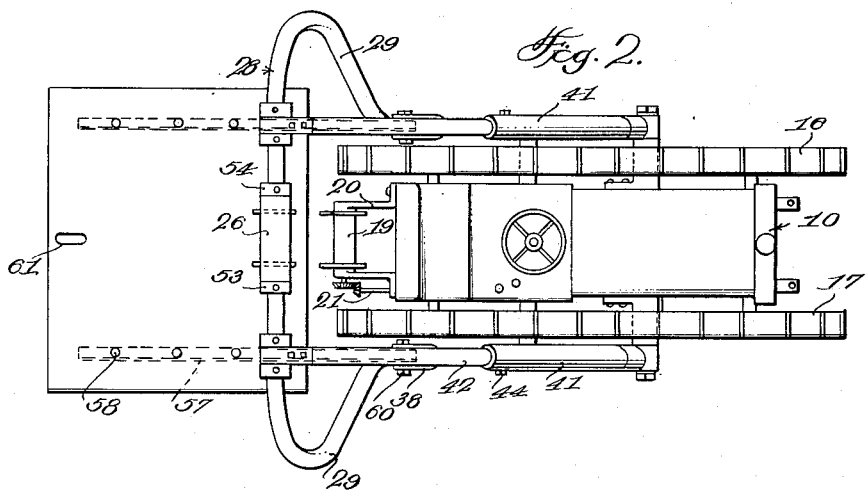
Figure 3:

In the drawings:

Figure 1 is a detail side elevation of a tractor having an attachment constructed according to an embodiment of this invention mounted thereon, Figure 2 is a detail top plan of the tractor, Figure 3 is a sectional view taken on the line 3—3 of Figure 1, Figure 4 is a detail front elevation of the tractor and logging attachment, Figure 5 is a fragmentary top plan of one side of the tractor and logging structure, Figure 6 is a fragmentary enlarged sectional view taken on the line 6—6 of Figure 1, and Figure 7 is a fragmentary plan view partly in section showing the manner of attaching a portion of the rig or elevating structure to the frame of the tractor.

Referring to the drawings, the numeral 10 designates generally a tractor structure including a frame or body 11 provided with an engine or motor structure 13 and front and rear wheels 14 and 15 respectively. The tractor 10 has the wheels 14 and 15 thereof formed after the manner of sprocket wheels and a pair of endless tread or traction members 16 and 17 are trained over the wheels 14 and 15 and are provided with spaced apart lugs 18 so as to facilitate traction.

In the handling of logs it is desirable that the logs at times be elevated at one end and then pulled forwardly onto a skid and for this purpose I have provided a winding drum 19 which is supported by means of bracket members 20 at the rear of the tractor frame 11. The drum 19 is operatively connected to the engine or motor 13 by a shaft and gear structure 21. The drum 19 is adapted to have a cable or flexible member 22 wound thereabout and this cable or flexible member 22 passes over a rotatable pulley or upper drum 23. The drum or pulley 23 is rotatably mounted on a shaft 24 which engages a pair of dependent arms 25 carried by a sleeve or bushing 26. The sleeve or bushing 26 is mounted on the straight or horizontal portion 27 of a U-shaped bracing or rig member generally designated as 28.

The rig member 28 comprises a substantially U-shaped frame member which adjacent the bight thereof is bowed outwardly as at 29. This bowed structure is provided so as to permit the ends of logs or the like to swing laterally without striking the parallel portions of the U-shaped member 28. The parallel legs 30 of the frame member 28 are provided at their lower ends with an insert 31 which is secured as by bolts or rivets in the hollow lower end of the parallel leg members 30. This insert 31 provides a bearing structure and engages a reduced stud 33 which is carried by an outstanding relatively large stud 34. The stud 34 is provided with a base or inner flange 35 which is secured as by rivets or other fastening devices 36 to the side of the frame 11. The parallel legs 30 of the frame or rig member 38 are preferably bent longitudinally adjacent their lower ends as shown at 37 and at this point each leg 30 has a U-shaped shackle or clevis 38 engaging thereabout and secured as by welding 39.

The U-shaped rig member 28 is held in substantially upstanding position by means of a pair of upwardly and rearwardly inclined extensible bracing or holding members 40. The bracing members 40 comprise an inner tubular member 41 and an outer tubular member 42 which telescopes into the tubular member 41 and the tubular member 42 is provided with a plurality of longitudinally spaced apart holes 43 through which a bolt 44 engages, the bolt 44 engaging through the tubular member 41 and holding the two members 41 and 42 in longitudinally adjusted position.

The lower end of the tubular member 41 is provided with a bearing insert 45 which engages an outstanding supporting structure 46 provided with a base flange 47. The base flange 47 is secured as by bolts or rivets 48 to the side of the frame 11. The upper ends of the bracing members 40 are provided with an eye 49 which is secured in the upper end of a tubular member 42 by means of bolts or rivets 50. The eye 49 engages about the bight 27 of the U-shaped member 28 and this eye 49 is held against movement lengthwise of the bight 27 by means of collars 51 and 52 engaging on opposite sides of the eye 49. The sleeve member 26 for the drum supporting means is held against lengthwise movement on the bight 27 by means of end collars 53 and 54.

A skid or inclined platform 55 is secured to the shackles or clevis 38 and comprises plate 56 which is secured to a pair of channel members 57 as by bolts or rivets 58. The channel members 57 adjacent the rear ends thereof are bent upwardly on an obtuse angle as at 59 and the upwardly extended ends of the channel members 57 are secured between the shackle 38 by a bolt 60. The plate 56 is provided at a central point adjacent the outer edge thereof with an opening in the form of a slot 61 so that a hook 62 carried by the elevating member 22 may engage in the slot 61 and hook in the forward edge of the plate 56 so that this skid structure may be elevated as shown in dotted lines in Figure 1.

A pulling or towing drum 63 is secured on bracket members 64 carried by the frame 11 at a point below the elevating drum 19 and the drum 63 is connected to the motor or engine 13 by a gear train 65. A flexible member 66 in the form of a rope or cable is wound about the drum 63 and is provided with a hook 67 at its free end which is adapted to be engaged in a well known manner with a log so as to pull the log forwardly or in the direction of the tractor 10 while at the same time, the log may have its forward end elevated by means of the elevating cable 22.

In the use and operation of this device, when the tractor 10 is being moved to a place where it is desired to pull the logs, the skid or platform 55 is held in an upraised position as shown in dotted lines in Figure 1. In this position the elevating structure does not interfere with the normal operation of the tractor. When it is desired to pull one or more logs onto the skid 55 the skid is lowered and released from the hook 62. This hook 62 may then be attached to one end of a log and at the same time the hook 67 carried by the pulling cable 66 may be attached to the same log so as to permit the ready pulling in a horizontal movement of the log while holding one end of the log in a slightly elevated position. The ends of the logs may be pulled up onto the skid 55 and firmly held on this skid by means of the cable 66. The tractor may then be moved to the desired location dragging the logs with the forward ends of the logs in an elevated position on the skid 55. By attaching the forward end of the skid supporting beams or channel members 57 to the shackle or clevis 38 which is fixed to an arm of the U-shaped bracing member 28 the rig structure will not interfere with the operation of any of the present parts of the tractor and, if desired, the rig or elevating structure may be readily detached from the tractor merely by loosening the nuts on the threaded studs 33 and 46.

This attachment is an exceedingly simple attachment which may be mounted on a conventional tractor structure without changing any of the present parts of the tractor, it being only necessary that the outstanding trunnions or studs 33 and 46 be secured in outstanding position to the frame of the tractor. The rig structure supporting the U-shaped member 28 and the bracing members 40 extend at their upper ends beyond the rear end of the tractor so that when the elevating cable 22 is operated, the log will be elevated directly over the skid 55.

What I claim is:

1. A logging attachment for a tractor comprising a substantially U-shaped member, means engaging the bight of the member and the frame of the tractor for supporting the member with the bight thereof in upstanding position, laterally projecting studs fixed relative to the tractor and engaging the lower ends of said member for securing the free legs of the member to the frame of the tractor, a rotatable member carried by the bight of the U-shaped member, a flexible member engaging about said rotatable member, a skid member, a U-shaped shackle fixedly secured to the legs of said U-shaped member adjacent the lower ends thereof, and means swingably securing said skid member to said shackles.

2. A logging attachment for a tractor comprising a U-shaped frame member disposed in upwardly inclined position, means securing the free ends of said member to the frame of the tractor, means engaging the frame of the tractor and the bight of said member for fixedly holding said member in upwardly inclined position, a drum member, means rotatably supporting said drum member from the bight of said first member, a flexible member engaging about said drum, said frame member having the parallel legs thereof longitudinally bent in the direction of the tractor frame, a skid member, forwardly and upwardly extending arms secured to said skid member, a U-shaped shackle engaging said frame member at substantially the angle between the bent portions thereof, and means securing said arms to said shackles.

3. In combination with a tractor a substantially U-shaped frame member disposed in upwardly and rearwardly inclined position, laterally extending studs carried by the tractor and engaging the free ends of said member for securing the free ends of said member to the frame of the tractor, a pair of upwardly and rearwardly inclined bracing members, laterally extending studs carried by the tractor and engaging the lower ends of said bracing members for securing the lower ends of said bracing member to the frame of the tractor, means securing the upper ends of said bracing members to the bight of said frame member, an elevating drum, means rotatably supporting said drum from the bight of said frame member, a flexible member engaging about said drum, a pair of U-shaped shackle members, means fixedly securing said shackle members to said frame member adjacent the lower ends of the free legs thereof, a skid member, and means swingably securing said skid member to said shackles.

4. In combination with a tractor, a substantially U-shaped frame member disposed in upwardly and rearwardly inclined position with the bight thereof uppermost, a pair of outstanding studs, means securing said studs to the free ends of said frame member, means securing said studs to the frame of the tractor, a pair of longitudinally extensible bracing members, means securing an end of said bracing members to the frame of the tractor, means securing the opposite ends of said bracing members to the bight of said frame member, a dependent bracket carried by the bight of said frame member, a drum member rotatably engaging said bracket, a flexible member trained over said drum, a pair of U-shaped shackle members, means securing a shackle member to a leg of said frame member adjacent the lower end thereof, a skid member, a pair of channel members fixed to said skid member and extending forwardly and upwardly therefrom, and means swingably securing said channel members between the parallel legs of said shackles.

5. In a tractor structure, a logging attachment comprising a U-shaped frame member disposed in upwardly and rearwardly inclined position relative to said tractor, a pair of laterally extending studs, flanges carried by an end of each stud, means securing said flanges to the frame of the tractor, reduced extensions carried by each stud, means engaging the free ends of said frame member detachably securing said frame member on said studs whereby the free ends of said frame member will be disposed laterally of the wheels of the tractor, a pair of extensible bracing members, outstanding studs carried by the frame of the tractor engaging the lower ends of said bracing members, means detachably securing the lower ends of said bracing members on said latter studs, means securing the upper ends of said bracing members on the bight of said frame member, said frame member having outwardly bowed portions at the upper ends of the free legs thereof, an elevating drum, means swingably and rotatably supporting said drum from the bight of said frame member, an elevating cable engaging over said drum, the free legs of said frame member being longitudinally bent adjacent the lower ends thereof in the direction of the forward end of the tractor, a U-shaped shackle member engaging the bent portion of a leg of said frame member, a skid member, a pair of channel members fixed to said skid member and extending forwardly and upwardly therefrom, and means swingably securing said skid member to said shackle members.

ELSIE H. KING.